(No Model.)  2 Sheets—Sheet 2.

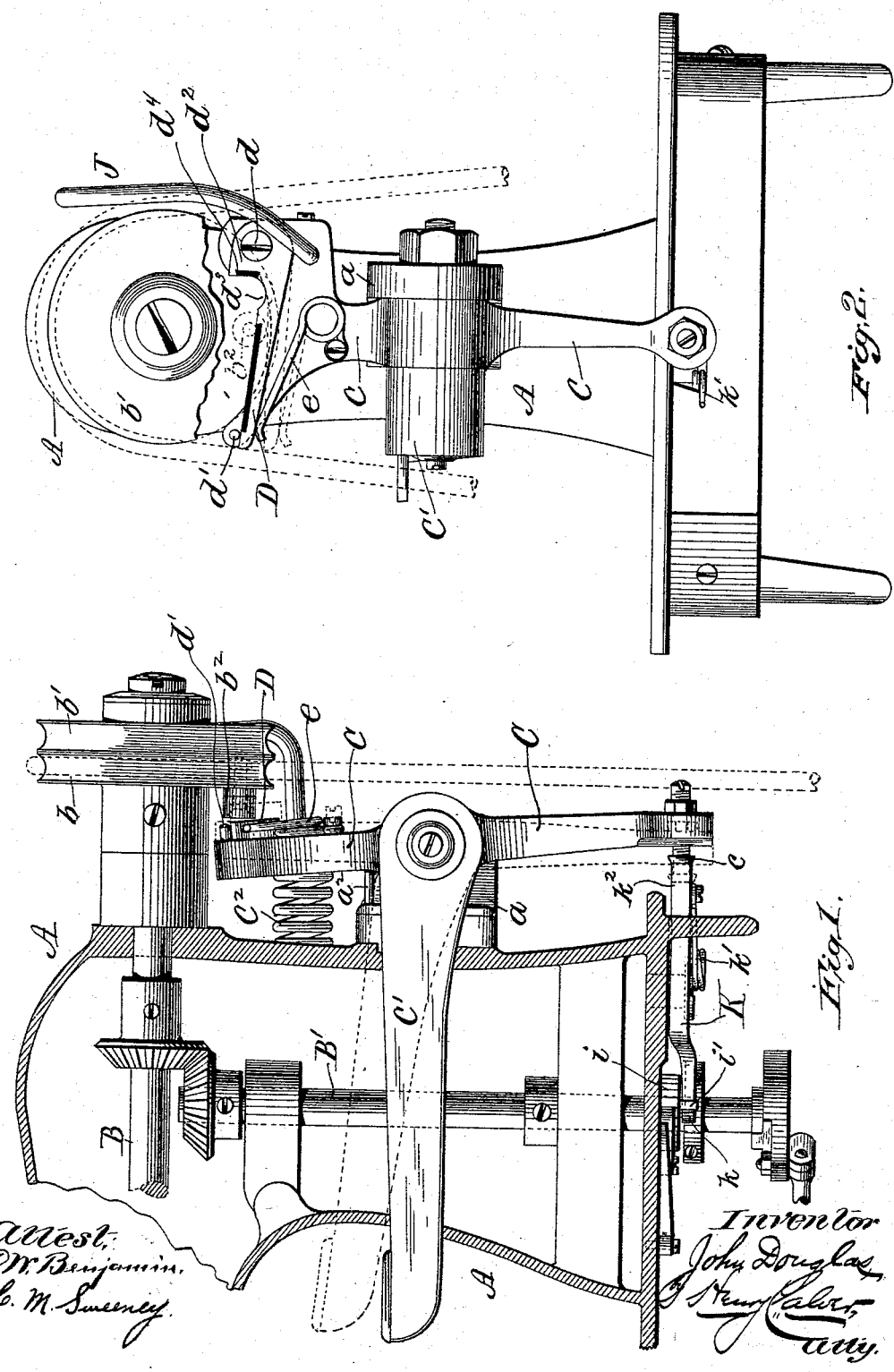

J. DOUGLAS.
STOP MECHANISM FOR SEWING MACHINES.

No. 543,442. Patented July 23, 1895.

Attest
C. W. Benjamin
C. M. Sweeney

Inventor:
John Douglas
by Henry Keller
atty.

UNITED STATES PATENT OFFICE.

JOHN DOUGLAS, OF ELIZABETH, NEW JERSEY, ASSIGNOR TO THE SINGER MANUFACTURING COMPANY, OF NEW JERSEY.

STOP MECHANISM FOR SEWING-MACHINES.

SPECIFICATION forming part of Letters Patent No. 543,442, dated July 23, 1895.

Application filed February 27, 1894. Serial No. 501,690. (No model.)

*To all whom it may concern:*

Be it known that I, JOHN DOUGLAS, a citizen of the United States, residing at Elizabeth, in the county of Union and State of New Jersey, have invented certain new and useful Improvements in Stop Mechanisms for Sewing-Machines, of which the following is a specification, reference being had therein to the accompanying drawings.

It is desirable in some classes of sewing-machines, such as tacking, buttonhole-stitching, buttonhole-barring, and button-sewing machines, that the machines shall be automatically stopped when a desired predetermined number of stitches have been made, and it is also desirable that a machine of any of the classes referred to should be stopped in a certain position—that is, with the needle-bar lifted; and my invention has for its object to provide a stopping mechanism which will supply this desideratum, and by means of which a machine may be stopped within a partial revolution of the driving-shaft, but without any injurious sudden jar or shock.

In carrying my invention into effect I provide a retarding device consisting preferably of a spring-pressed arm or lever movable into and out of the path of revolution, of a projection consisting preferably of pin or roller-stud carried by a driving wheel or pulley fast on the main shaft of the sewing-machine and co-operating with said retarding device or lever, and preferably formed as a part thereof is a stopping-abutment, just in front of which is a locking-notch to receive said projection or stud and thus prevent the driving wheel or pulley, when suddenly stopped, from rebounding. The said retarding device or spring-pressed arm and stopping-abutment are preferably carried by a starting and stopping lever, the position of which, to bring said retarding device or arm and abutment into the path of said projection or stud, is governed by an automatic mechanism, so that when a desired number of stitches have been made the machine will be stopped.

Figure 3:
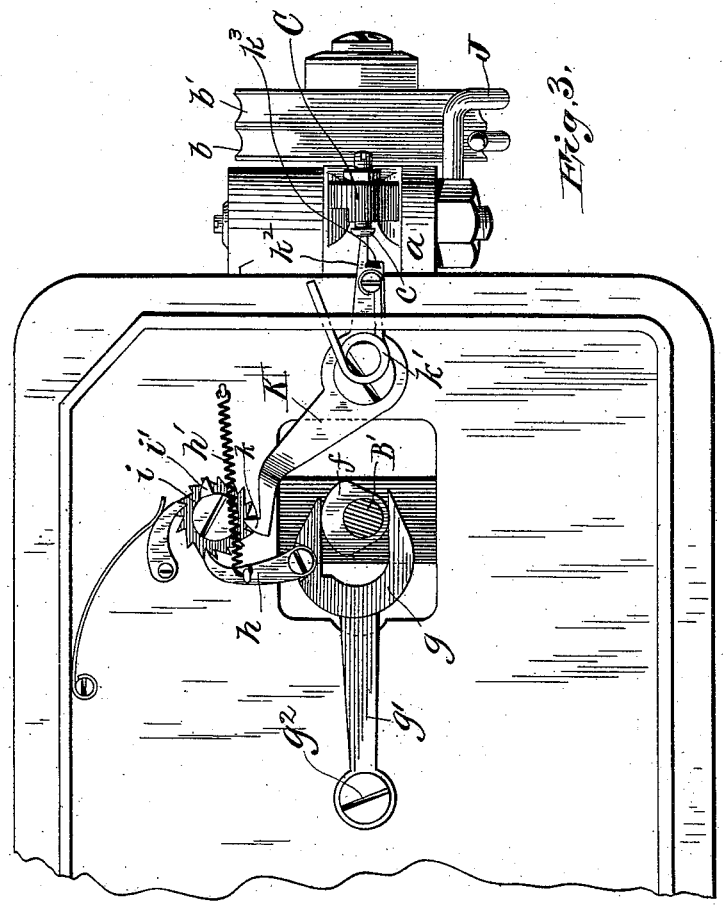
Figure 4:
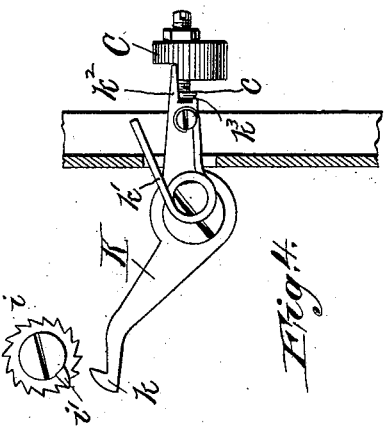

In the accompanying drawings, Figure 1 is a partial sectional side view of a sewing-machine with my invention applied thereto. Fig. 2 is a rear end view, and Fig. 3 is a partial bottom view of the same. Fig. 4 is a detail view.

A denotes the arm and B the main or driving shaft of a sewing-machine, said shaft in the form of my invention herein shown being provided with the fast driving wheel or pulley $b$ and the loose pulley $b'$, the wheel or pulley $b$ carrying the horizontally-projecting pin or roller-stud $b^2$. On the arm A is a small bracket $a$, pivotally supporting a stopping and starting lever C, having a horizontally-extending operating arm or handle $C'$, a coil-spring $C^2$ pressing against the upper arm of said lever to force said arm outward.

D is a retarding device or arm pivoted at $d$ to the lever C and normally pressed upward against a stop-pin $d'$ by a stiff spring $e$. The rear part $d^2$ of the arm D serves as an abutment to be engaged by the pin or stud $b^2$ to bring the wheel or pulley $b$ and driving-shaft, to which the said wheel or pulley $b$ is secured, to a full stop after having been slowed down by the contact of the said pin or stud with the said arm D, the latter being preferably provided, just in front of the abutment $d^2$, with a notch $d^3$ to receive the said pin or stud $b^2$ and thus prevent the pulley $b$ from rebounding when suddenly stopped. A small block $d^4$, of compressed rawhide or other similar elastic material, is preferably inserted in the abutment $d^2$ to receive the impact of the said pin or stud $b^2$.

The position of the lever C, to cause the retarding-arm D and stopping-abutment $d^2$ to be moved into the path of the pin or stud $b^2$ to stop the machine when a desired number of stitches have been made, may be governed by any suitable automatic mechanism, that which I have herein shown, for the purpose of fully illustrating the operation of my invention, being the same as that shown in my Patent No. 516,190, dated March 13, 1894, and which I will now describe.

Geared to the main shaft B, to rotate coincidently therewith, is a vertical shaft B', provided near its lower end with a cam $f$ embraced by a yoke $g$, of a lever $g'$ pivoted at $g^2$ to the work-plate of the machine, said yoke being provided with a pawl $h$ held in contact with a ratchet-wheel $i$ by a coil-spring $h'$, and said ratchet-wheel having on its lower face a lug or projection $i'$ to be brought into engagement with the toe $k$ at the inner end of a lever K, the outer end of which is normally held by a spring $k'$ in position to engage a pin or projection $c$ at the lower end of the lever C to hold said lever in the position shown by full lines in Fig. 1, but when, in the rotation of the ratchet-wheel $i$, the toe $k$ of the lever K is engaged by the lug or projection $i'$ on said ratchet-wheel, the outer end of said lever is moved out of engagement with the pin or projection $c$ of the lever C, (see Fig. 4,) thereby permitting the spring $C^2$ to move said lever to the position shown by dotted lines, Fig. 1, to bring the retarding-arm D and stopping-abutment $d^2$ into the path of the pin or stud $b^2$ to stop the machine.

The lever C is, in the form of my invention herein shown, provided with a belt-shifter J, which, when the machine is to be stopped, shifts the power-transmitting driving-belt (shown by dotted lines in Figs. 1 and 2) from the fast pulley $b$ to the loose pulley $b'$ and again returns the belt to the said fast pulley to start the machine, when the arm or handle $C'$ is depressed by the operator to remove the stopping-abutment from the pin or stud $b^2$, and when said lever C is thus moved to the position shown in full lines in Fig. 1 the outer end $k^2$ of the lever K is forced by its spring $k'$ into holding contact with the pin or projection $c$ of the lever C. I do not, however, wish to be understood as limiting my invention to the fast and loose pulleys and belt-shifter and belt, as the power-transmitting and disconnecting device to be used with my improved stop as a friction-clutch power-transmitter, such as is shown by my patent hereinbefore referred to, may, if desired, be substituted for the belt-shifter and fast and loose pulleys, as will be obvious.

The operation of my invention will be readily understood from the foregoing.

When the desired number of stitches (determined in the present instance by the number of teeth of the ratchet-wheel $i$) have been taken, the holding device or lever K is tripped by the engagement of the lug or projection $i'$ with the toe $k$ of said lever, thus permitting the spring $C^2$ to move the lever C in position to bring the retarding-arm D and stopping-abutment $d^2$ into the path of rotation of the pin or stud $b^2$ on the fast wheel or pulley $b$, and as said pin or stud engages said arm the stiff holding-spring $e$ for the latter yields somewhat, but still holds said arm with sufficient force against said pin or stud, so that by the time said pin or stud reaches the stopping-abutment $d^2$ the momentum of the moving parts of the machine is nearly overcome, and thus the machine is now stopped without injurious sudden shock or jar.

When the end $k^2$ of the lever K is removed from the pin or projection $c$ of the lever C the movement of the latter under the stress of the spring $C^2$ is limited by the shoulder $k^3$ on the lever K, into contact with which shoulder said pin or projection comes, and when the arm or handle $C'$ is depressed (to start the machine) the movement of the said lever C by said arm or handle connected therewith is limited by the stop-pin $a^2$ on the bracket $a$.

Having thus described my invention, I claim and desire to secure by Letters Patent—

1. In a sewing machine, the combination with the main shaft thereof provided with a fast driving wheel or pulley having a stud or projection, of a starting and stopping lever, a spring-pressed arm and stopping abutment both carried by said lever and both of which are movable into the path of said stud or projection, so as to be successively engaged thereby, when the machine is to be stopped, and automatic mechanism for changing the position of said lever, to move said arm and abutment into the path of said stud or projection, when a desired number of stitches have been made.

2. In a sewing machine, the combination with the main shaft thereof provided with a fast driving wheel or pulley having the pin or stud $b^2$, of a power-transmitting device, the spring-pressed stopping and starting lever C, the spring-pressed arm D carried by said lever and provided with a stopping abutment, said arm and abutment being arranged to be successively engaged by said pin or stud on said wheel or pulley, a holding device to retain said stopping and starting lever in a position to permit the power to be transmitted to said driving wheel or pulley, and an automatic tripping mechanism whereby said holding device may, when desired, be moved to permit said starting and stopping lever to be shifted to a position to disconnect the power from the said driving shaft.

3. In a sewing machine, the combination with the main shaft thereof provided with fast and loose pulleys $b$ and $b'$, the former having the laterally projecting pin or stud $b^2$, of the spring-pressed starting and stopping lever C having the pin or projection $c$ and a belt shifter, the spring-pressed retarding arm D pivoted to said lever and provided with the stopping abutment $d^2$, the spring-pressed holding lever K, the wheel $i$ having the tripping lug $i'$ to engage a portion of said lever, and means for rotating said wheel $i$ to cause the said tripping lug to engage said lever K to stop the machine when a desired number of stitches have been made.

In testimony whereof I affix my signature in presence of two witnesses.

JOHN DOUGLAS.

Witnesses:
HENRY CALVER,
J. G. GREENE.